United States Patent
Lee et al.

(10) Patent No.: US 10,104,631 B2
(45) Date of Patent: Oct. 16, 2018

(54) UNIQUE WORD (UW) BASED MULTIPLE ACCESS SIGNAL ACQUISITION TECHNIQUE

(71) Applicant: Hughes Network Systems, LLC, Germantown, MD (US)

(72) Inventors: Lin-Nan Lee, Potomac, MD (US); Liping Chen, Bethesda, MD (US); Victor Liau, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 72 days.

(21) Appl. No.: 15/184,797

(22) Filed: Jun. 16, 2016

(65) Prior Publication Data

US 2016/0373934 A1    Dec. 22, 2016

Related U.S. Application Data

(60) Provisional application No. 62/180,957, filed on Jun. 17, 2015, provisional application No. 62/180,948, filed on Jun. 17, 2015.

(51) Int. Cl.
*H04W 74/08*    (2009.01)
*H04B 1/69*     (2011.01)
(Continued)

(52) U.S. Cl.
CPC ............ *H04W 56/005* (2013.01); *H04B 1/69* (2013.01); *H04B 1/7105* (2013.01);
(Continued)

(58) Field of Classification Search
CPC ........... H04W 56/005; H04W 74/0833; H04W 74/085; H04W 12/10; H04B 1/69; H04L 25/03872
See application file for complete search history.

(56) References Cited

U.S. PATENT DOCUMENTS 7,961,880 B2 * 6/2011 Wang ...................... H04K 1/00
  375/148
2004/0088445 A1 * 5/2004 Weigold ............... G06F 13/426
  710/8
(Continued)

OTHER PUBLICATIONS

M. Eroz and L. N. Lee, "Scrambled Coded Multiple Access," Sep. 5-8, 2011, IEEE Vehicular Technology Conference (VTC Fall), San Francisco, CA, pp. 1-5.*

(Continued)

*Primary Examiner* — Nelson Giddins
(74) *Attorney, Agent, or Firm* — Potomac Technology Law, LLC

(57) ABSTRACT

A communications terminal comprises an encoder configured to encode a digital data signal to generate an encoded signal, a scrambler configured to scramble the encoded signal based on a scrambling signature, and a modulator configured to modulate resulting data frames for transmission via a random access communications channel. Each frame comprises a data payload, including a block of the scrambled signal, and a header, including a start of frame (SOF) sequence associated with the scrambling signature. Use of the SOF sequence for each frame provides a synchronization reference and serves to designate the associated scrambling signature for decoding the respective data payload. Use of the SOF sequence for each frame further serves to distinguish between the data frame and data frame(s) originating from further communications terminal(s), transmitted via a common time slot of the channel, for which different scrambling signature(s) were used to scramble respective encoded signal(s) thereof.

17 Claims, 8 Drawing Sheets

(51) Int. Cl.
  *H04W 56/00* (2009.01)
  *H04L 25/03* (2006.01)
  *H04W 12/10* (2009.01)
  *H04B 1/7105* (2011.01)
  *H04J 13/00* (2011.01)

(52) U.S. Cl.
  CPC ...... *H04J 13/0003* (2013.01); *H04J 13/0029* (2013.01); *H04L 25/03872* (2013.01); *H04W 12/10* (2013.01); *H04W 74/0833* (2013.01); *H04W 74/085* (2013.01)

(56) References Cited

U.S. PATENT DOCUMENTS

| | | | | |
|---|---|---|---|---|
| 2007/0074242 | A1* | 3/2007 | Wang | H04K 1/00 725/31 |
| 2007/0206638 | A1* | 9/2007 | Santoru | H04N 21/4382 370/476 |
| 2009/0028324 | A1* | 1/2009 | Eroz | H03M 13/2903 380/28 |
| 2009/0213782 | A1* | 8/2009 | Yee | H04L 12/413 370/321 |
| 2010/0098245 | A1* | 4/2010 | Fang | H03M 13/2903 380/38 |
| 2010/0105405 | A1* | 4/2010 | Vujcic | H04J 13/22 455/452.1 |
| 2010/0122143 | A1* | 5/2010 | Lee | H03M 13/1117 714/752 |
| 2010/0157881 | A1* | 6/2010 | Santoru | H04N 21/4382 370/317 |
| 2011/0176603 | A1* | 7/2011 | Beeler | H04L 1/0003 375/240.02 |
| 2011/0189995 | A1* | 8/2011 | Tinnakornsrisuphap | H04W 36/0061 455/436 |
| 2013/0142288 | A1* | 6/2013 | Dinan | H04L 27/2649 375/340 |
| 2014/0201602 | A1* | 7/2014 | Eroz | H04J 11/003 714/775 |
| 2014/0321861 | A1* | 10/2014 | Ota | H04B 10/2503 398/136 |
| 2014/0341010 | A1* | 11/2014 | Jiang | H04J 13/0059 370/208 |
| 2016/0128100 | A1* | 5/2016 | Yi | H04L 5/0016 370/329 |

OTHER PUBLICATIONS

L. N. Lee, M. Eroz, L. Chen and R. Gopal, "Scrambled Code Multiple Access waveform for micro satellite terminals," Oct. 29, 2012, MILCOM 2012 IEEE Military Communications Conference, Orlando, FL, pp. 1-6.*

USPTO, "International Search Report and Written Opinion", PCT/US2016/037914, dated Mar. 23, 2017.

* cited by examiner

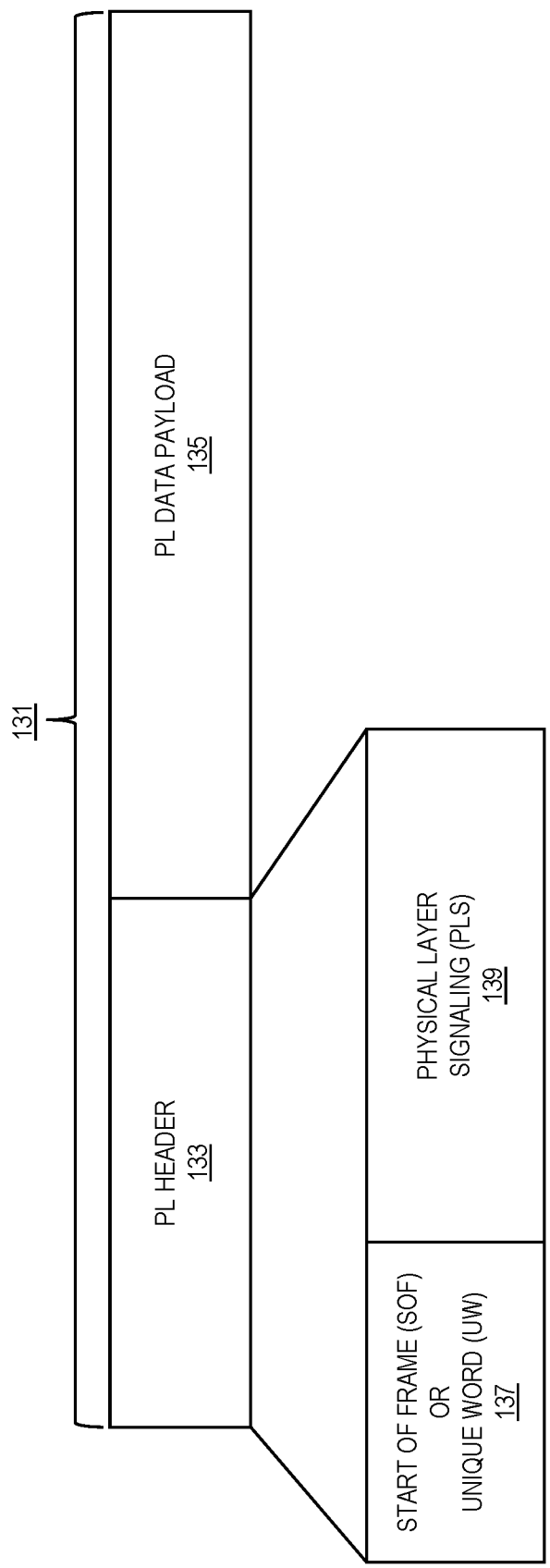

UNIQUE WORD (UW) BASED MULTIPLE ACCESS SIGNAL ACQUISITION TECHNIQUE

RELATED APPLICATIONS

This application claims the benefit of the earlier filing date under 35 U.S.C. § 119(e) from U.S. Provisional Application Ser. No. 62/180,948 (filed 2015 Jun. 17) and U.S. Provisional Application Ser. No. 62/180,957 (filed 2015 Jun. 17), which are incorporated herein by reference herein in their entireties.

BACKGROUND

Multiple access schemes are employed by modern radio systems to allow multiple users to share a limited amount of bandwidth, while maintaining acceptable system performance. Common multiple access schemes include Frequency Division Multiple Access (FDMA), Time Division Multiple Access (TDMA) and Code Division Multiple Access (CDMA). System performance is also aided by error control codes. Nearly all communications systems rely on some form of error control for managing errors that may occur due to noise and other factors during transmission of information through a communication channel. These communications systems can include satellite systems, fiber-optic systems, cellular systems, and radio and television broadcasting systems. Efficient error control schemes implemented at the transmitting end of these communications systems have the capacity to enable the transmission of data including audio, video, text, etc., with very low error rates within a given signal-to-noise ratio (SNR) environment. Powerful error control schemes also enable a communication system to achieve target error performance rates in environments with very low SNR, such as in satellite and other wireless systems where noise is prevalent and high levels of transmission power are costly, if even feasible.

Interleave Division Multiple Access (IDMA) is a multiple access technique where different users that share the same bandwidth and time slots are separated by user specific interleavers. As the bandwidth and power become scarce to support the ever increasing throughput requirements, more complex but more efficient techniques play more important roles in future communication systems. IDMA is an effective technique that trades extra receiver complexity with bandwidth and power savings. On the other hand, in systems where the number of users is high and the block size is large, storage of a high number of long interleavers may be undesirable. Scrambled Coded Multiple Access (SCMA) addresses this complexity by using a single scrambling sequence with different shift factors for different users without any performance penalty. With SCMA, the user specific interleavers of IDMA are replaced with user specific scrambler sequences. While there is no noticeable performance difference between the two approaches, generation and implementation of scrambler sequences is significantly simpler. In fact, the same scrambler sequence with different rotation factors can be used for different users with no impact on performance, which further reduces receiver complexity. With SCMA, therefore, all of the benefits of IDMA are achieved with reduced complexity.

Similar to IDMA or random waveform Code Division Multiple Access (CDMA), SCMA is a non-orthogonal multiple access technique. While orthogonal multiple access schemes such as Time Division Multiple Access (TDMA) or Frequency Division Multiple Access (FDMA) are implicitly too restrictive to achieve theoretical limits in fading channels, non-orthogonal CDMA, IDMA or SCMA have the potential of achieving these limits. Further, as discussed above FEC coding is typically used to improve the performance. The main difference between CDMA and SCMA is that, while in CDMA different users are separated with different signature sequences with a spreading factor greater than one, in SCMA even a spreading factor of one would be enough to detect overlapped users based on user specific scrambler sequences and iterative multiuser cancellation with FEC decoding. As a result, the available bandwidth can be used for very low rate coding which gives SCMA extra coding gain that is not available in CDMA. Actually it is also possible to use SCMA with a spreading factor greater than one. Another benefit of the iterative receiver structure of SCMA is that the system performance actually improves with power variations among the users, which eliminates the need of power control, an important requirement of traditional CDMA.

At the receiver, iterative multiuser detection or interference cancellation followed by decoding is performed to approach maximum likelihood (ML) receiver performance without excessive complexity. But for coded CDMA systems, even this iterative receiver may lead to complicated algorithms especially when the number of users is large. Typically with CDMA, the complexity of multiuser detection or soft interference cancellation algorithms grows in polynomial form with the number of users/user terminals. On the other hand, similar to IDMA, SCMA lends itself to a simple chip by chip detection algorithm whose total complexity grows only linearly with the number of users. Further, uncoded SCMA systems perform at least as well as and usually better than uncoded CDMA, and the performance gap between the two classes of schemes grows bigger for heavily loaded systems.

Further, in conventional burst mode communication systems, a transmitter transmits burst mode signals at a certain frequency, phase and timing, which is received by a receiver through a communication channel. In conventional burst mode communication systems, it is necessary to quickly estimate various parameters of the received bursts as they arrive. These parameters include detection of the presence of a burst (start time), frequency, initial phase, timing and amplitude. In typical burst transmission systems, a unique word is used to facilitate the identification of the beginning of a transmitted burst and the determination of phase offset, by the receiver. The term "Unique Word" (UW) refers to a known, pre-determined pattern (known a priori to the receiver) that is transmitted at the beginning of each burst, whereby the receiver detects the UW and synchronizes with the received bursts (i.e., the receiver estimates the burst parameters based on the detected UW). For classical TDMA systems, the same UW is used by all of the terminals.

While the complexity of SCMA grows only linearly with the number of users, however, with larger systems (e.g., having upwards of tens or hundreds of thousands of user terminals), SCMA system implementations can become relatively complex with each user/user terminal having a distinct scrambling signature. What is needed, therefore, is an approach for an SCMA system that scales more efficiently, and in a relatively less complex manner, to support a relatively large number of users/user terminals.

Some Example Embodiments

Embodiments of the present invention advantageously address the foregoing requirements and needs, as well as others, by providing an approach for an SCMA system that scales more efficiently in a relatively less complex manner, whereby individual terminals utilize respective assigned unique words and the receiver correlates received signal bursts against these UWs, which supports larger numbers of users/user terminals.

Example embodiments of the present invention provide a new SCMA multiple access approach that facilitates random access to a communications channel by a network of terminals in an efficient manner without prior coordination. In accordance with such example embodiments, unique words are respectively assigned to individual terminals, and each terminal utilizes its assigned UW for each transmitted burst. At the receiver side, a receiver correlates the received signal bursts against these UWs to determine whether one or more terminals is accessing the channel and the number of terminals accessing the channel (assuming there is at least one), to identify the scrambling signature or initial vector each such terminal is utilizing to access the channel, and to synchronize with (e.g., determine the timing and phase of) each individual received modulated signal for proper demodulation and decoding. By way of example, a moderately sized set of UWs is assigned to the terminal population, where each different UW is associated with a respective scrambling signature (or, in the case of the use of the same scrambling signature with a different seed or initial vector, each different UW is associated with a respective initial vector) for the scrambler. Accordingly, a receiver separates overlapping transmissions from multiple terminals at the same frequency and the same time slot, based on a UW correlation process employed to detect the transmitted UWs in parallel and thereby identify the number of terminals accessing the channel and the scrambling signature/initial vector of each such terminal, and to synchronize with each individual received modulated signal for proper demodulation and decoding.

In accordance with example embodiments, a communications terminal comprises and encoder, a scrambler and a modulator. The encoder is configured to encode a source digital data signal to generate an encoded signal, wherein the source digital data signal comprises a source bit stream. The scrambler is configured to scramble the encoded signal based on a scrambling signature. The modulator is configured to modulate a received sequence of data frames to generate a transmission signal for transmission via a random access channel of a wireless communications system, wherein each data frame comprises a data payload, which includes a block of the scrambled encoded signal, and a frame header, which includes a start of frame (SOF) sequence associated with the scrambling signature. The use of the SOF sequence for each frame of the sequence of data frames provides a reference for synchronization on frame boundaries and serves to designate use of the associated scrambling signature for descrambling and decoding the respective data payload of the frame. The use of the SOF sequence for each frame of the sequence of data frames serves to distinguish between the data frame and at least one data frame originating from a further communications terminal, transmitted via a common time slot of the random access channel, for which a different scrambling signature was used to scramble a respective encoded signal thereof.

In accordance with further example embodiments, a multiple access communications scheme is provided. A source digital data signal is encodes to generate an encoded signal, wherein the source digital data signal comprises a source bit stream. The encoded signal is scrambled based on a scrambling signature. A received sequence of data frames is modulated to generate a transmission signal for transmission by a communications terminal via a random access channel of a wireless communications system, wherein each data frame comprises a data payload, which includes a block of the scrambled encoded signal, and a frame header, which includes a start of frame (SOF) sequence associated with the scrambling signature. The use of the SOF sequence for each frame of the sequence of data frames provides a reference for synchronization on frame boundaries and serves to designate use of the associated scrambling signature for descrambling and decoding the respective data payload of the frame. The use of the SOF sequence for each frame of the sequence of data frames serves to distinguish between the data frame and at least one data frame originating from a further communications terminal, transmitted via a common time slot of the random access channel, for which a different scrambling signature was used to scramble a respective encoded signal thereof.

In accordance with example embodiments, a further multiple access communications scheme is provided. A transmitted signal is received via a random access channel of a wireless communications network, wherein the transmitted signal originated from a first communications terminal. A first start of frame (SOF) sequence of the transmitted signal is identified, and synchronization is attained on a frame boundary of a first data frame associated with the first SOF sequence. A first scrambling signature is determined based on the identified SOF sequence, and the first data frame is decoded using the determined scrambling signature. The first SOF sequence serves to distinguish between the respective data frame and at least one data frame originating from a further communications terminal, transmitted via a common time slot of the random access channel, for which a different scrambling signature was used to scramble a respective encoded signal thereof.

In accordance with example embodiments, a system comprises a first communications terminal and a second communications terminal. The first communications terminal comprises a first encoder, a first scrambler and a first modulator. The first encoder is configured to encode a first source digital data signal to generate a first encoded signal, wherein the first source digital data signal comprises a first bit stream. The first scrambler is configured to scramble the first encoded signal based on a first scrambling signature. The first modulator is configured to modulate a received first sequence of data frames to generate a first transmission signal for transmission via a random access channel of a wireless communications system, wherein each data frame comprises a data payload, which includes a block of the scrambled first encoded signal, and a frame header, which includes a first start of frame (SOF) sequence associated with the first scrambling signature. The second communications terminal comprises a second encoder, a second scrambler and a second modulator. The second encoder is configured to encode a second source digital data signal to generate a second encoded signal, wherein the second source digital data signal comprises a second bit stream. The second scrambler is configured to scramble the second encoded signal based on a second scrambling signature. The second modulator is configured to modulate a received second sequence of data frames to generate a second transmission signal for transmission via the random access channel of the wireless communications system, wherein each data frame comprises a data payload, which includes a block of the scrambled second encoded signal, and a frame header, which includes a second start of frame (SOF) sequence associated with the second scrambling signature. The use of the first SOF sequence for each frame of the first sequence of data frames provides a reference for synchronization on frame boundaries and serves to designate use of the first scrambling signature for descrambling and decoding the respective data payload of the frame, and the use of the second SOF sequence for each frame of the second sequence of data frames a reference for synchronization on frame boundaries and serves to designate use of the second scrambling signature for descrambling and decoding the respective data payload of the frame, even where at least one frame of the first sequence of data frames and at least one frame of the second sequence of data frames are received in a common time slot of the random access channel.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements, and in which:

FIG. 1E illustrates, for example, the frame format of a physical layer frame, for example, in accordance with the DVB S2 framing structure, channel coding and modulation systems standard;

DETAILED DESCRIPTION

Figure 1A:
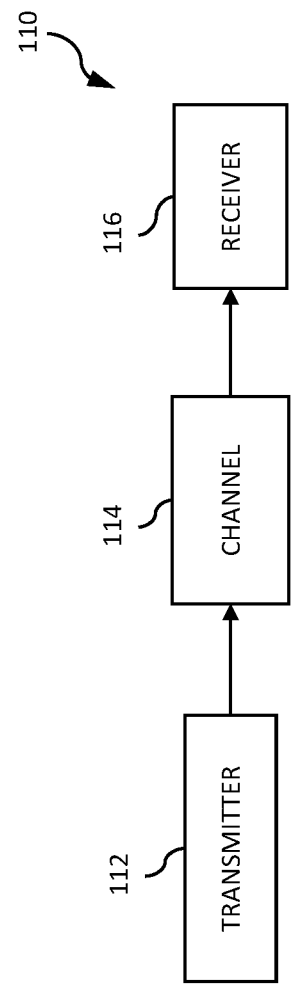
FIGS. 1A and 1B illustrate communications systems capable of employing approaches in accordance with example embodiments of the present invention.

A method, system, and software for providing a scrambled coded multiple access (SCMA) scheme is described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Figure 1B:
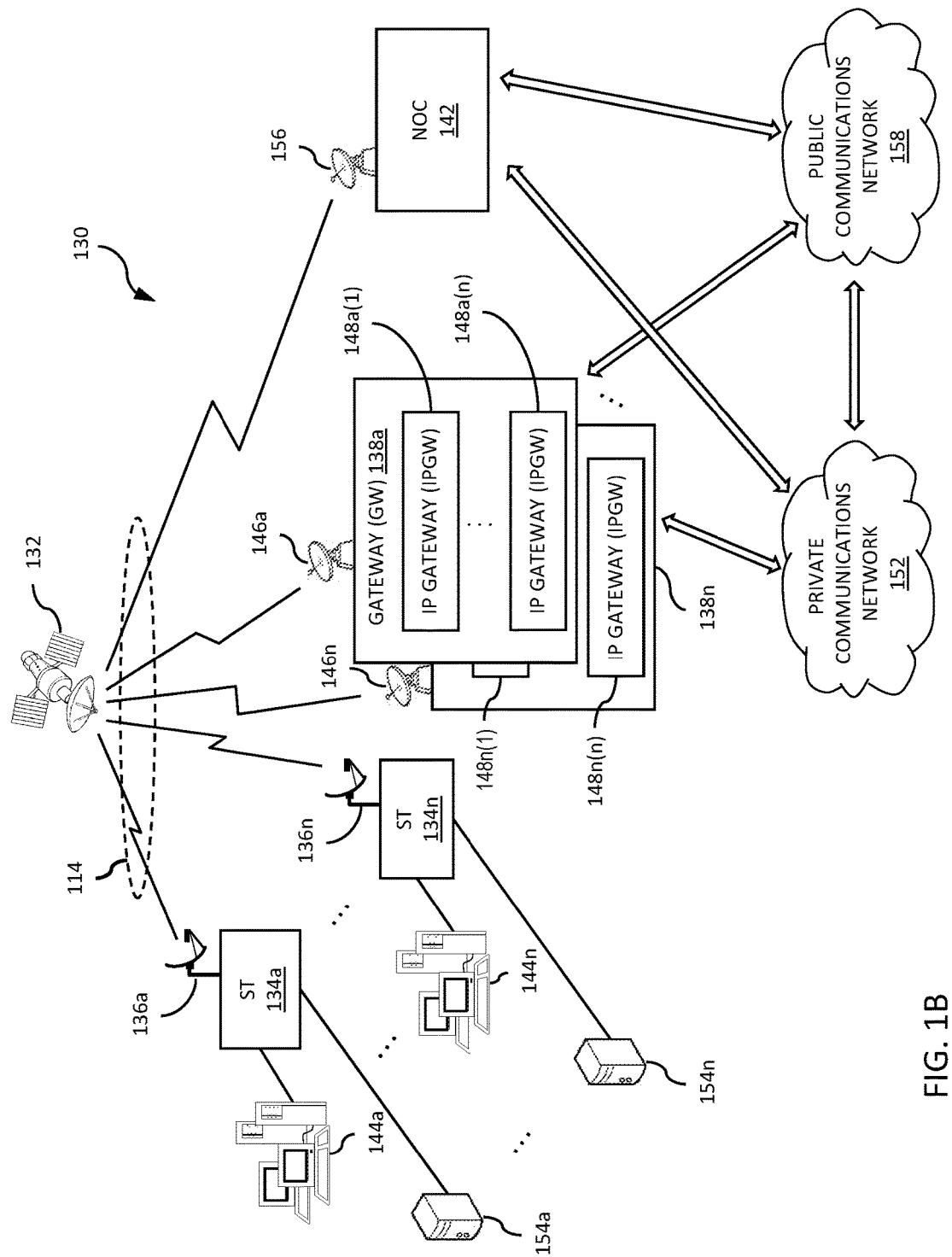
Figure 1C:
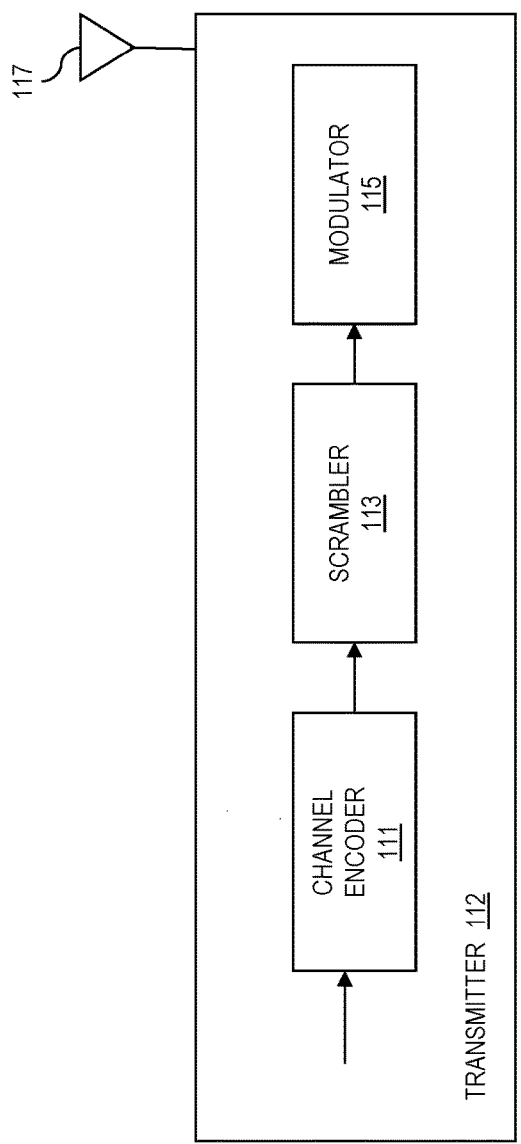
FIG. 1C illustrates a block diagram depicting a transmitter configured to operate in the systems of FIGS. 1A and 1B, in accordance with example embodiments of the present invention.

FIGS. 1A, 1B, 1C illustrate communications systems capable of employing approaches according to various example embodiments of the present invention. With reference to FIG. 1A, a broadband communications system 110 includes one or more transmitters 112 (of which one is shown) that generate signal waveforms for transmission to one or more receivers 116 (of which one is shown). The signal waveforms are transmitted across a communications channel 114, which (for example) may comprise a channel of a terrestrial, wireless terrestrial or satellite communications system. In this discrete communications system 110, the transmitter 112 has a signal source that produces a discrete set of data signals, where each of the data signals is transmitted over a corresponding signal waveform. The discrete set of data signals may first be encoded (e.g., via a forward error correction code) to combat noise and other issues associated with the channel 114. Once encoded, the encoded signals may then be modulated onto a carrier for transmission over the channel 114. The signal waveforms are attenuated, or otherwise altered, by communications channel 114.

FIG. 1B illustrates an example satellite communications system 130 capable of supporting communications among terminals with varied capabilities, according to example embodiments. Satellite communications system 130 includes a satellite 132 that supports communications among multiple satellite terminals (STs) 134a-134n, a number of gateways (GWs) 138a-138n, and a network operations center (NOC) 142. The STs, GWs and NOC transmit and receive signals via the antennas 136a-136n, 146a-146n, and 156, respectively. According to different embodiments, the NOC 142 may reside at a separate site reachable via a separate satellite channel or may reside within a GW site. The NOC 142 performs the management plane functions of the system 130, while the GWs 138a-138n perform the data plane functions of the system 130. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138a-138n include one or more IP gateways (IPGWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Accordingly, an inroute manager or inroute group manager (IGM) (not shown) may be located at each of the gateways. The IGM may be configured to control the bandwidth allocations to the remote terminals (e.g., on an inroute or inroute group basis), and to correspondingly control and administer the bandwidth allocation approaches provided in accordance with the example embodiments of the present invention. Further, as would be appreciated, in certain embodiments, the IGM may be deployed in a distributed manner, with a main controller at the NOC 142, whereby the NOC may be configured to administer system-wide controls for such bandwidth allocation approaches, whereas the inroute-based controls would be administered for specific inroutes/inroute groups by the IGM at the respective gateway that controls such inroutes/inroute groups. Various other architectures may also be provided to meet respective different system design goals and requirements.

The IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n).

In a bent-pipe system of an example embodiment, the satellite 132 operates as a repeater or bent pipe, and communications to and from the STs 134a-134n are transmitted over the satellite 132 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

FIG. 1C illustrates a block diagram depicting a transmitter configured to operate in the systems of FIGS. 1A and 1B, in accordance with example embodiments of the present invention. With reference to FIG. 1C, a transmitter 112 is equipped with a channel encoder (e.g., a turbo encoder or low density parity check code (LDPC) encoder) 111 that accepts input from an information source and outputs coded stream of higher redundancy suitable for error correction processing at the receiver. The information source generates k signals from a discrete alphabet X. The channel encoder 111 may utilize a combination of a constituent encoder that uses one or more constituent codes and an interleaver (not shown) to implement the channel coding procedure. For example, turbo codes are produced by parallel concatenation of two codes (e.g., convolutional codes) with an interleaver in between the encoders. A low-density parity-check (LDPC) code is a linear error correcting code, constructed using a sparse bipartite graph. Any linear code has a bipartite graph and a parity-check matrix representation, but not all linear codes have a sparse representation. An n×m matrix is sparse if the number of 1's in any row (the row weight $w_r$) and the number of 1's in any column (the column weight $w_c$) is much less than the respective dimension (i.e., $w_r \ll m$, $w_c \ll n$). A code represented by a sparse parity-check matrix is called a low density parity check (LDPC) code. Essentially, the encoder 111 generates the encoded signals/symbols from alphabet Y, and the channel scrambler 113 scrambles the alphabet (e.g., the channel scrambler pseudo-randomizes the code symbols). The scrambled signals are fed to a modulator 115, which maps the encoded messages from encoder 111 to signal waveforms that are forwarded to a transmit antenna 117. The antenna 117 emits these waveforms over the communication channel 114. The transmissions from the transmit antenna then propagate to a receiver, as discussed below.

Figure 1D:
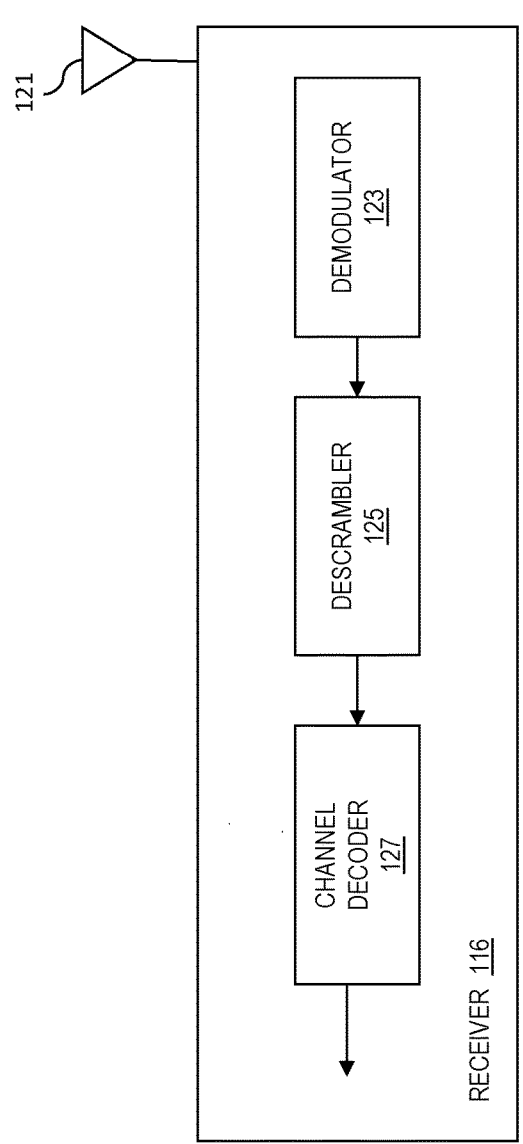
FIG. 1D illustrates a block diagram depicting a receiver configured to operate in the systems of FIGS. 1A and 1B, in accordance with example embodiments of the present invention.

FIG. 1D illustrates a block diagram depicting a receiver configured to operate in the systems of FIGS. 1A and 1B, in accordance with example embodiments of the present invention. At the receiving side, a receiver 116 includes an antenna 121 that receives the waveforms emitted over the channel 114 by the transmitter 112. The receiver 116 provides a demodulator 123 that performs demodulation of the received signals. After demodulation, the received signals are forwarded to a channel de-scrambler 125, which unscrambles the demodulated symbols. A decoder 127 then attempts to reconstruct the original source messages.

It is contemplated that the above transmitter 112 and receiver 116 can be deployed in within a single wireless terminal, in which case a common antenna system can be shared. The wireless terminal can for example be configured to operate within a satellite communication, a cellular system, wireless local area network (WLAN), etc.

Figure 2A:
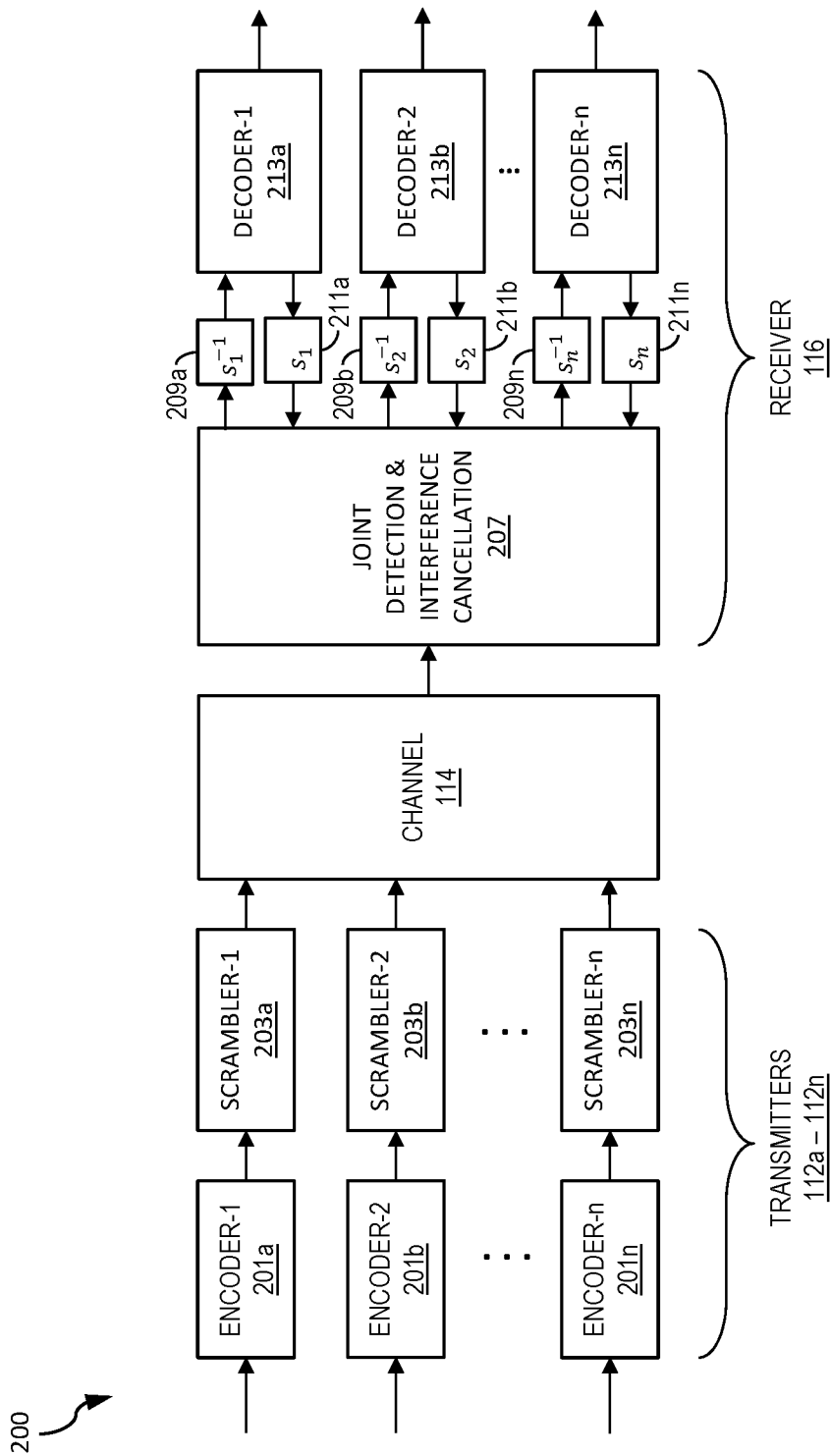
FIG. 2A illustrates a block diagram depicting a system with multiple transmitters using an SCMA scheme, in accordance with example embodiments of the present invention.
Figure 2B:
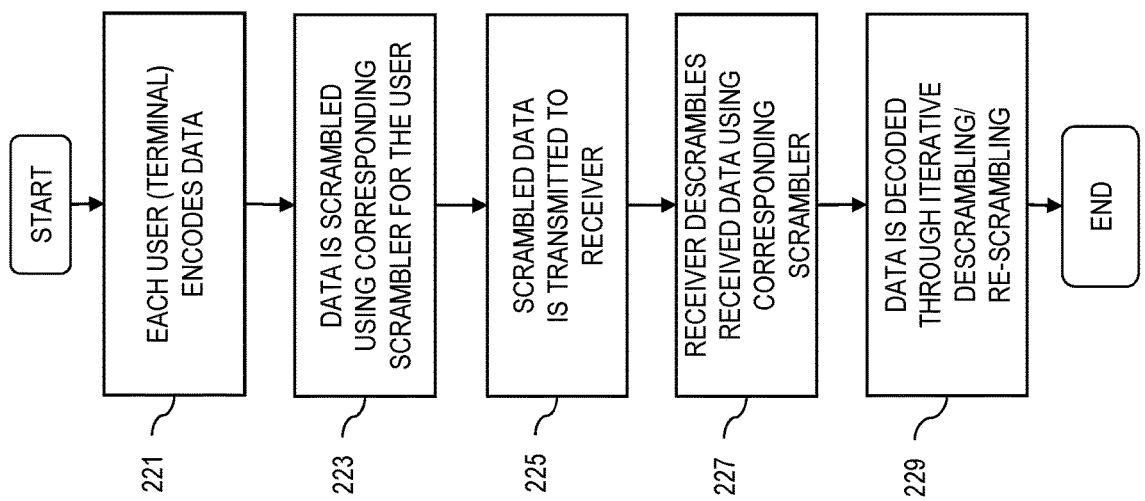
FIG. 2B illustrates a flow chart depicting a scrambling process of the system of FIG. 2A, in accordance with example embodiments of the present invention.

FIG. 2A illustrates a block diagram depicting a system with multiple transmitters using an SCMA scheme, in accordance with example embodiments of the present invention, and FIG. 2B illustrates a flow chart depicting a scrambling process of the system of FIG. 2A, in accordance with example embodiments of the present invention. For the purposes of illustration, a communication system 200 supports multiple transmission terminals (i.e., users) 112$a$-112$n$, each configured with a respective encoder 201$a$-201$n$ and scrambler 203$a$-203$n$.

In accordance with example embodiments, the system 200 provides an SCMA multiple access scheme, which achieves good performance with relatively lower receiver complexity compared to CDMA (as the number of users that share the same channel increases). With SCMA, each user sharing the transmission channel is separated by user specific scrambling sequence or initial vector utilized by the respective scramblers 203$a$-203$n$. According to one embodiment, by using low rate codes (e.g., low rate turbo codes or low rate LDPC codes), the system 200 achieves greater power efficiency while spreading the spectrum, whereas conventional CDMA does not. By way of example, each of the encoders 201$a$-201$n$ utilizes the same error correction codes. The encoded sequences are then fed to the respective user/terminal-specific scramblers 203$a$-203$n$. The scrambled sequences are then transmitted over the channel 114 to a receiver 116. Additionally, SCMA is different from the IDMA multiple access technique, which also spreads with low-rate turbo-Hadamard codes but uses random interleavers to provide for the distinct user signatures. With such implementations of SCMA, the low-rate decoders are much more straightforward to implement, and all users can utilize the same scrambler hardware, each using a distinct initial vector or seed to provide a distinct terminal scrambling signature. Further, using scrambling sequences as signatures is simpler than random interleaver-based signatures.

By way of example, each terminal encodes its data with, for example, a rate 1/n FEC code, where n is an integer larger than 3. The coded bits are then scrambled with a unique scrambling sequence and transmitted. The number of unique sequences are virtually unlimited with common sequence generators, such as the Gold sequences. Alternatively, the same generator can generate all the sequences, which are differentiated for each terminal by use of a distinct initial vector or seed. Further, other low rates m/n can be utilized (e.g., less than 1/3). By way of further example, the scrambling sequence can be generated by selecting a pseudorandom number sequence (e.g., a Gold sequence) whose period is greater than the code block. On the receiver side, the receiving terminal utilizes the corresponding de-scrambler and a rate 1/n decoder to retrieve the data. The signals are modulated by the same type of modulation, e.g., QPSK, of the same bandwidth, centered at the same frequency and transmitted at the same time (e.g., similar to CDMA). Further, for receivers located in a hub of a star-shaped network, the antennas can be shared. As mentioned, use of scramblers (as opposed to interleavers) reduces complexity. In a large system with numerous users, it is difficult to deploy a large number of interleavers that are prearranged between each pair of sender and receiver, whereas a common scrambler with different initial vector (also known as "seed") can be used for each pair of sender and receiver. Such arrangement is substantially easier to implement.

According to a further embodiment, the receiver includes a joint detector/interference canceller unit 207 that interacts with the decoders 213$a$-213$n$ to iteratively produce an estimate of the received codewords. With each iteration, the decoder 213$a$-213$n$ produces a better estimate to the joint detector/interference canceller 207 for achieving better cancellation. The information exchanged between the decoders 213$a$-213$n$ and the joint detector/interference canceller 207 is scrambled or descrambled via scramblers 209$a$-209$n$ or de-scramblers 211$a$-211$n$, respectively. Once "good" estimates of the decoded sequences are produced, they are output from the decoders 213$a$-213$n$. Unlike conventional CDMA systems, the joint-detection/interference canceller 207 does not require all the signals accessing the same spectrum at the same time to be of equal power. In fact, the performance is better when the signals are of different power level. Thus, no tight power controls are needed. Also due to joint-detection/interference cancellation, the system 200 provides a scheme that is much more robust against Rician fading, which makes it particularly more attractive for small mobile terminals experiencing Rician multipath fading.

With reference to FIG. 2B, in accordance with example embodiments, the SCMA system 200 may operate as follows. In step 221, each terminal encodes data using the corresponding encoder (e.g., the respective encoders 201$a$-201$n$). Each terminal then scrambles the encoded data via the respective scrambler (e.g., the respective scrambler 203$a$-203$n$), and transmits the encoded and scrambled data over the channel 114 to the receiver 116, per steps 223 and 225. At the receiver 116, the received signal is processed by the joint detector/interference canceller 207, and then undergoes an iterative descrambling and re-scrambling process, per step 227. The descrambling and re-scrambling is performed in conjunction with the decoding process, which outputs decoded data (step 229).

In accordance with such example embodiments, as an SCMA system using low-rate FEC coding, the system 200 requires less power to transmit data at the same speed vis-à-vis a CDMA system. In one embodiment, the system 200 can be operated in a random access manner and does not require reservation of time slots, which minimize the delay to one satellite round trip. Additionally, as mentioned above, the system 200 does not require tight power control, minimizing the coordination needed between transmitters 112 and the receiver 116.

Further, in a time division multiple access system (TDMA), for example, several communications terminals may share the same communications channel (e.g., of a common frequency). In the TDMA system the signal transmitted over the channel is segregated into different time slots, where each communications terminal transmits using its own time slot. This allows multiple stations to share the same transmission medium (e.g. radio frequency channel) while using only a part of its channel capacity. At the physical layer the data is configured in the form of data frames. FIG. 1E illustrates, for example, the frame format of a physical layer frame 131, for example, in accordance with the DVB S2 framing structure, channel coding and modulation systems standard. Each frame 131 generally comprises a header 133 and a data payload 132. The header is appended to the data payload for such purposes as, for example, synchronization, demodulation and decoding at the receiver. The data payload comprises the encoded (and, in the case of SCMA, scrambled) source data sequence. The header includes a start of frame (SOF) or unique word (UW) segment 137, and a physical layer signaling field 139. The PLS field reflects certain modes regarding, for example, the modulation and encoding schemes applied to the data. The UW provides a mechanism for the receiver (e.g., receiver 116) to synchronize on the frame boundaries, and accordingly locate the data payload within each frame. The data payload includes the data and information intended to be received and processed by the destination receiver. By way of example, the receiver receives the transmitted signal, which comprises a series of physical layer data frames. Further, the receiver possesses a priori knowledge of the UW sequence(s) utilized by the respective transmitting terminal(s). The receiver can then search for the respective UW(s) by performing a correlation operation. Once a threshold has been met for the correlation operation, the receiver determines a starting time for the first symbol of the respective UW. Based on the determined starting time for the initial UW symbol, the receiver has thus also determined the initial time of reception or start of the respective physical layer data frame. The receiver can then synchronize and process the symbols of the respective data payload based on the determined initial time of reception or start of the respective physical layer data frame.

In a large-scale shared bandwidth communications system, a number of channels may be designated as random access contention channels for terminals to send short messages, such as control messages—i.e., for establishing a particular data communication session or for providing bandwidth requests to a resource allocation manager located at a respective Gateway. Such a random access contention channel may be implemented as a slotted Aloha (S-Aloha) channel. Aloha is a communications networking protocol, which can be implemented in two different versions or protocols depending on whether or not global synchronization is required. Pure Aloha does not require global synchronization. The basic idea of Pure Aloha is that a terminal is permitted to transmit data on the channel whenever the terminal has data to send. The transmitting terminal monitors feedback and is thereby able to detect when its transmitted data collides with data transmitted by another terminal in the same time slot. If a collision is detected, the transmitting terminal will wait a random or predetermined period of time and then attempt the transmission again. The waiting period of each terminal is randomized so that the same transmissions are not delayed the same amount of time and thus the same collision does not occur repeatedly. By contrast, Slotted Aloha or S-Aloha requires global time synchronization. Based on the synchronization, the S-ALOHA protocol divides time into discrete intervals and each interval corresponds to a time slot for transmission of a frame of data (where all terminals are synchronized with respect to the slot boundaries). By contrast to Pure Aloha, the S-Aloha protocol does not permit a terminal to transmit any time, but instead requires the terminal to wait for the beginning of the next slot for transmission. When a terminal has data to send, therefore, it must wait for the beginning of the next time slot before transmitting the data. With the S-Aloha protocol, while collisions can still occur, the frequency of collisions is reduced based on the transmission occurring only at the beginning of a time slot.

The main difference between SCMA and S-Aloha is that the SCMA scheme permits multiple terminals to transmit data in the same time slot (where the transmitted data of each terminal is distinguished based on a distinct scrambling signature), whereas the S-Aloha scheme only permits data of a single terminal to be transmitted in a respective time slot (otherwise a collision occurs in the data cannot be correctly received by a receiver). More specifically, according to one embodiment, where a common scrambler is used in an SCMA scheme, the data transmitted by each terminal is scrambled by different segments of a pseudo-random number sequence of that same scrambler, where each segment is generated based on a distinct initial vector (or seed). The scrambling of the encoded data by each terminal based on a distinct initial vector results in a distinct signature whereby the data transmitted by the multiple terminals in a common time slot can be distinguished based on that signature.

In a large-scale system, however, where the number of terminals reaches relatively large numbers (e.g., tens or even hundreds of thousands of terminals), traditional SCMA schemes may become impractical, or even relatively impossible. For example, in such a traditional SCMA system with a relatively large number of terminals, when multiple terminals transmit in a single time slot, the receiver will have no way of knowing which terminals are transmitting in that timeslot. The receiver may synchronize on a unique word signifying that data has been transmitted within a respective time slot, but would then have to cycle through or search all of the possible scrambling signatures or scrambling signature initial vectors to determine which terminals have transmitted the data. Accordingly, with such large numbers of terminals, such decoding would become very complex and time-consuming, and would thereby be impractical for such a system.

In accordance with example embodiments, therefore, an approach is provided that enables the scaling of traditional SCMA schemes for such large-scale systems. According to one such embodiment, a unique word (UW) of sufficient length is associated with each of the scrambling signatures or initial vectors, where each terminal is assigned a UW and associated scrambling signature or initial vector. When transmitting data, each terminal scrambles the encoded data symbols using the assigned scrambling signature or initial vector and appends the respective UW as part of the header of each transmitted packet. On the receiver end, by detecting the presence of one or more UWs within a respective time slot, the receiver determines that one or more respective messages or data bursts have been transmitted within that timeslot, where each such data burst has been scrambled based on the scrambling signature or initial vector associated with the respective UW. Then, the receiver can proceed with the processing of each of the received data bursts based on the respective scrambling signature or initial vector associated with the UW of that data burst.

With regard to the implementation of the SCMA protocol, embodiments of the present invention can be applied to either the scenario where each terminal utilizes a unique scrambling signature or sequence for scrambling the encoded symbols of the data transmitted by the terminal, or the scenario where each terminal uses the same scrambling signature with a unique initial vector or seed for scrambling the encoded symbols of the data transmitted by the terminal. In the case of each terminal utilizing a unique scrambling signature, each assigned UW is associated with a respective scrambling signature, and, in the case of each terminal utilizing the same scrambling signature with a unique initial vector, each assigned UW is associated with a respective initial vector. Accordingly, while the embodiments of following description is in the context of the SCMA scenario where each terminal utilizes a common scrambling signature with a unique initial vector, one of skill in the art will recognize that such embodiments may also be applied to the SCMA scenario where each terminal utilizes a unique scrambling signature.

With this embodiment, each terminal is assigned a distinct UW and associated initial scrambling vector, each user may be given a separate UW, so the terminal can be uniquely identified based on identification of its UW and the respective unique initial vector can be used for decoding/descrambling its messages. As the scale of a large-scale shared bandwidth satellite network or satellite beam increases to potentially many thousands of users, assignment of a distinct UW to each such terminal becomes impractical in terms of the UW correlation process required at the receiver. More specifically, in practice, while only a handful of the terminals may have data to transmit at any given time, at the beginning of each burst or time slot, the receiver would still have to search or correlate based on all of the UWs of the terminals (including the majority of terminals that have not transmitted any data at that given time). Accordingly, such receivers would require extremely complex processing at the front end, which would be impractical and costly to implement.

In accordance with further example embodiments, therefore, SCMA approaches are provided that take advantage of the fact that, in practice, only a relatively small number of terminals will require access to the random access contention channel at the same time. According to one such embodiment, a relatively small number of UWs are assigned to a respective number of terminal groups. The universe of deployed terminals are grouped among the terminal groups, and each terminal of a terminal group is assigned the UW and associated initial scrambling vector or signature for that group. Accordingly, because only a relatively small number of terminals may be accessing the contention channel at the same time slot, the probability of two or more users using the same UW within that slot relatively low. By way of example, a few hundred terminal groups and respective UW's can be employed to divide a universe of many thousands of terminals (e.g., tens or even hundreds of thousands) by a factor that reduces the probability of burst collisions within a time slot down to a level of minimal impact to system performance.

According to another such embodiment, the UWs are chosen such that their auto-correlation and cross-correlation functions or properties drop rapidly even with increasing time offsets (e.g., even with one symbol or chip time offset). Based on this selection of UWs, bursts from terminals transmitting with the same UW in the same time slot can still be differentiated by the receiver, as long as the bursts are not synchronized within one symbol. For example, in practice, the received UWs for the data burst transmitted within a given time slot will not likely be received in a synchronized or aligned fashion. If two UWs are perfectly synchronized or aligned, then their auto-correlation is at a peak—and if two aligned UWs are the same, then the receiver will not be able to distinguish the associated data bursts as between the two transmitting terminals. Alternatively, the more likely scenario would be that the two UWs would not be received in an aligned or synchronized fashion, and thus (even if the two UWs are the same) the receiver would still be able to distinguish between them because of the diminished correlation with respect to the offset UW.

With such a configuration or implementation, when terminals of different groups attempt to access a common time slot, each terminal will use the UW and associated initial scrambling vector of its group. Between groups, therefore, the receiver will thereby be able to differentiate the transmission of a terminal of one group from the transmissions of the terminals of other groups based on the correlation with the distinct UW utilized by the terminal. Further, based on time offsets, when multiple terminals of the same group attempt to access a common time slot, the receiver may still be able to differentiate between the transmissions of the multiple terminals. The fact that it would be highly unlikely that two or more terminals within the same group transmit a burst within the same time slot in the synchronized manner, each UW at the transmitting terminal would be received out of sync or offset from the UW of each of the other terminals from the same group transmitting within that timeslot. Accordingly, based on the auto-correlation properties of the UWs, the receiver can differentiate between two of the same UWs transmitted within a single time slot in an offset manner.

Within the context of such example embodiments, an SCMA receiver correlates the multiple UWs against the received signal to determine whether one or more terminals has transmitted data over the channel, and (if so) the number of terminals accessing the channel in each time slot, to determine the scrambling sequence or initial vector that each such terminal is using to scramble its data as part of the SCMA protocol, and to determine the timing and phase of the respective modulated signals of each such terminal in order to facilitate demodulation and decoding of the respective data bursts.

In accordance with further example embodiments, various approaches are provided to reduce the probability of data burst collisions within a given time slot. According to one such embodiment, the number of terminals of a particular group permitted to transmit within a given time slot may be controlled to reduce the number of terminals that may transmit at any given time. By way of example, a particular terminal group may be partitioned into subgroups where each subgroup would be permitted to transmit and only certain time slots. Such a scheme, however, reduces each terminal's access to the respective contention channel and thereby increases latency by forcing the terminal to wait for an assigned time slot to access the channel and transmit its data. Also, such a scheme departs from the random access aspect of such a contention channel. According another such embodiment, the number of UWs assigned within a given system may be increased in order to increase the available number of terminal groups and correspondingly decrease the number of terminals in each group. Obviously, as the number of terminals within a given group decreases, the likelihood or probability that two or more terminals within that group may require access to the contention channel at the same time diminishes accordingly. According to yet a further embodiment, the aperture or the time period within which a terminal is permitted to start the transmission of a burst may be widened or lengthened, which correspondingly reduces the likelihood or probability that two terminals within a given group would access the same time slot in a synchronized or aligned manner. Conversely, if the aperture is made narrower, the collision probability correspondingly increases. Increasing the number of UWs and/or increasing the burst aperture length, however, consequently results in increased complexity in the unique word processing of the receiver, and thus a trade-off exists between the improvements in collision probability achieved by such increases and the added processing complexity of the receiver.

Figure 3:
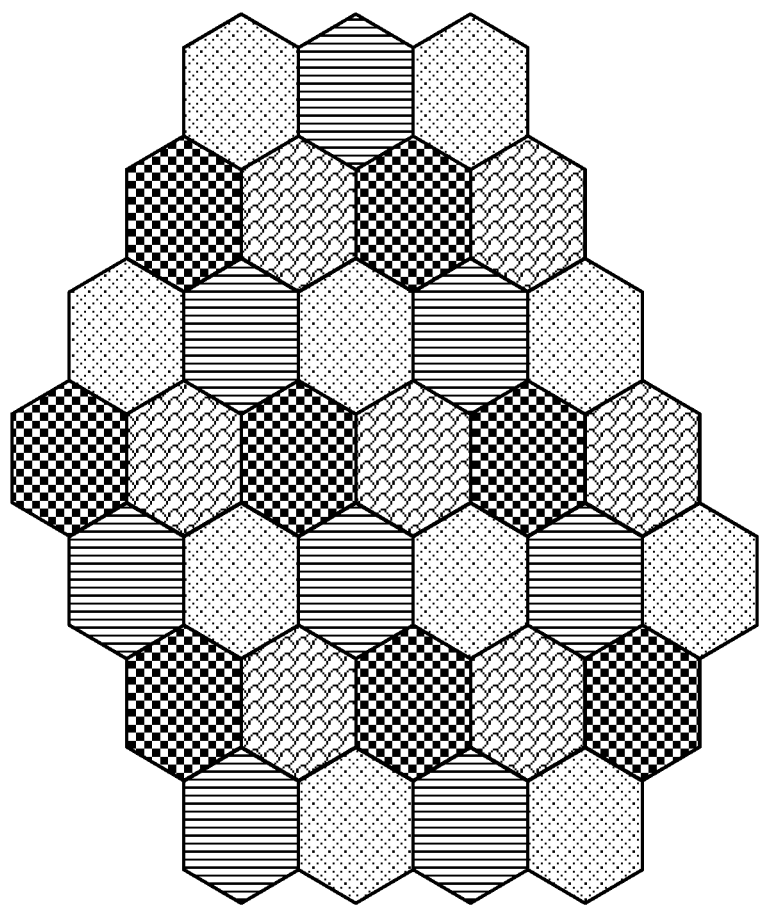
FIG. 3 illustrates a hexagon satellite beam laydown pattern with a frequency reuse plan of a reuse factor of 4, in accordance with example embodiments of the present invention.

In accordance with further example embodiments, various approaches are provided for mapping the user terminals among the terminal groups in order to distribute the respective UWs in a manner that reduces collision probabilities. According to one such embodiment, a fixed assignment of a UW and initial scrambling vector pair may be set for each terminal. By way of example, the assignment may be fixed as a modulo n function of the manufacturing serial number, where n represents the total number of UWs allowed by the system (and therefore the number of UWs searched by the SCMA receiver). As is evident, assigning a UW and initial vector pair to a terminal necessarily sets the terminal group to which that terminal belongs. Then, the distribution of the terminal groups (i.e., the UW and initial vector pairs) would be based on the distribution channels and deployment of the particular terminals. FIG. 3, for example, illustrates a hexagon satellite beam laydown pattern with a frequency reuse plan of a reuse factor of 4, in accordance with example embodiments. In such a hexagon beam laydown pattern, each beam can have up to 6 co-channel neighboring beams (where, in the figure, each fill pattern reflects a beam using a one of the four frequency bands). In such a multi-beam system, the transmission from terminals in different beams are isolated by satellite beam patterns to a large extent, and further by frequency and polarization isolation among immediately adjacent beams. Terminal groups sharing the same UW in different beams, therefore, generally would not interfere with each other. FIG. 3 shows that the immediately adjacent beams are using a different frequency and/or polarization.

Accordingly, from a practical standpoint, the method of a fixed assignment of a UW and initial scrambling vector pair for each terminal would likely result in a sufficient random geographic distribution of the UW and initial vector pairs deployed in the system—where, with a random geographic distribution, it would be unlikely that a disproportionate number of terminals within a particular beam would be assigned the same UW and initial vector pair. With such a fixed assignment (e.g., the assignment of the UW and initial vector pair using a modulo operation based on the serial number), however, there is limited control over the grouping and distribution of the various terminals. For example, unless particular controls are implemented, there is little or no control over the distribution of the terminals of each UW group in actual deployment. Further, developing and implementing any such controls necessarily adds to system overhead in complexity with regard to initial terminal deployment and ongoing management of that deployment, based on the assigned UW terminal grouping.

According to another such embodiment, the system may be configured whereby, at the time a terminal requires access to a contention channel for a data transmission, the terminal randomly selects a UW and initial vector pair that it will use for that current data transmission. By way of example, at the time the terminal desires to access the contention channel, the terminal would generate a modulo n random number and would use the generated random number as an index into a table of UW and initial vector pairs available within the system. With this embodiment, no permanent association is set between a terminal and any particular UW and initial vector pair. Further, the distribution of UWs and terminal groups is randomized and continually changing, which dynamic randomization should contribute to diminished collision probabilities. It should be noted, however, that because modulo n is a many-to-one mapping, there is a nonzero probability two terminals may use the same UW at the same time within the same time slot or modulation symbol duration. Again, however, there is the added unlikelihood that the two terminals with the same UW will transmit in the synchronized aligned manner, and thus the receiver may still be able to differentiate between the transmissions of the two terminals.

In order to further reduce the collision probability, according to a further embodiment, the SCMA technique utilizes the auto-correlation property of the UWs. As mentioned above, the terminals typically are incapable of synchronizing data transmissions in the time slots of a contention channel to an accuracy whereby the transmitted bursts arrive at the receiver at precisely the same symbol or chip time (i.e., the multiple UWs that may be received in a particular time slot are received in an unsynchronized or misaligned manner). If the synchronization inaccuracy amounts to ±k chips, the probability that two transmissions from different terminals with the same UW arrive at the satellite at the same chip time is reduced by a factor of on the order of $\frac{1}{2}k$. To even further reduce the collision probability, each of the terminals may generate a modulo m random number, which the terminal would use to determine a start time for the UW transmission with respect to a common system or network time reference (e.g., a time reference of the satellite), where the start time would be in terms of a number of chips offset from the common time reference based on the generated modulo m random number. With this random offset, the probability of two or more terminals using the same UW to transmit at exactly the same chip time can thereby be reduced by a factor of $1/(2k+m)$. On the receiver side, the receiver would begin to search the UW in a window n [−k, k+m] chip time from the common reference. This search window is also known as aperture in time division multiple access (TDMA) receiver operation. The aperture reflects a window of uncertainty during which the receiver determines whether any bursts have been received within the respective time slot, and the receiver must complete the correlation processing within that aperture (i.e., within every sample time, the receiver cycles through the UW processing for the particular burst) in order to keep pace with the received data signals.

Accordingly, since the receiver has no idea which of the n UWs will be received in each chip time or sample time, it needs to search all n possible UWs. It follows that, for each time slot, the receiver needs to perform $n \times (2k+m+1)$ UW correlations during the burst aperture. The search result identifies the presence of a number of UWs at a particular time offset, and subsequent receiver processing to separate the transmitted messages within the time slot, using these UWs can then begin.

According to a further embodiment, the pool of UW and initial vector pairs from which a terminal may select a UW and initial vector pair for a particular transmission may be set as a subset of all system available UW and initial vector pairs. In this manner, the distribution of UWs can be controlled, for example, on a beam-by-beam basis. By way of example, each terminal of a particular beam can be programmed with a table of UW and initial vector pairs of the subset or pool of UW and initial vector pairs assigned to that beam. For example, while a total of 256 UW and initial vector pairs may be available in an overall system, these UW and initial vector pairs may be geographically distributed in groups of 32. In the distribution case on a beam-by-beam basis, each of a group of neighboring beams may be assigned a different subgroup of the 32 UW and initial vector pairs. Each terminal within a particular one of the neighboring beams would be programmed such that, at the time it requires access to a contention channel of the respective beam, the terminal would randomly select a UW and initial vector pair from the respective group of 32 UW and initial vector pairs assigned to the respective beam. This configuration would prevent a terminal of one beam from transmitting on a contention channel of an adjacent beam using a same UW and initial vector pair as may be used on that contention channel by a terminal of the adjacent beam. Additionally, by way of further example, as the number of deployed terminals and geographic distribution of those deployed terminals within the system changes, the pools of UW and initial vector pairs assigned to the respective beams can be re-sized and/or reallocated on a dynamic basis (e.g., by dynamically reprogramming the table of available UW and initial vector pairs stored in the terminals).

In any event, as would be evident to one of skill in the art, the design goal for the implementation of the assignment of UW and initial scrambling vector pairs is to reduce the data collision probability within a contention channel to appoint where it is sufficiently low so as not adversely impact system performance of the SCMA protocol to an unacceptable level. Further, as mentioned above, the number of UWs n deployed in a system would be set in view of the trade-off between a reduction in collision probability associated with an increased number and the associated added processing complexity of the receiver.

In accordance with further example embodiments, in a multi-beam satellite network, the UWs and associated initial scrambling vectors may also be used to differentiate the user terminal populations among beams that use the same frequencies. With reference again to FIG. 3, the hexagon beam laydown pattern results in each beam having up to 6 co-channel neighboring beams (where, in the figure, each fill pattern reflects a beam using a one of the four frequency bands). Further, as the UWs are detected based on correlation over many symbols, along with the detection of a signal from one beam using a particular UW, even with neighboring beam isolation based on frequency and/or polarization, it is possible that a signal using the same UW in an adjacent co-channel beam may also be detected (i.e., co-channel interference with regard to the received data bursts and associated unique words). This interference may then pose potential problems for the receiver in distinguishing different signals/bursts within a time slot. Such co-channel interference may still occur, even though the signal strength should be well-attenuated by the satellite antenna beam pattern. According to one example embodiment, one approach to mitigate this potential problem would be by increasing the number of separate pools by a factor of seven, or again creating subsets or UW pools for the different beams, as discussed above). While this does not increase the number of UW to be searched per beam, when the UWs are used for this purpose, the size of a set of UW and initial vector pair table stored in the receiver would have to be expanded to accommodate up to seven co-channel beams. The same concept can also be applied to terrestrial wireless systems.

Figure 4:
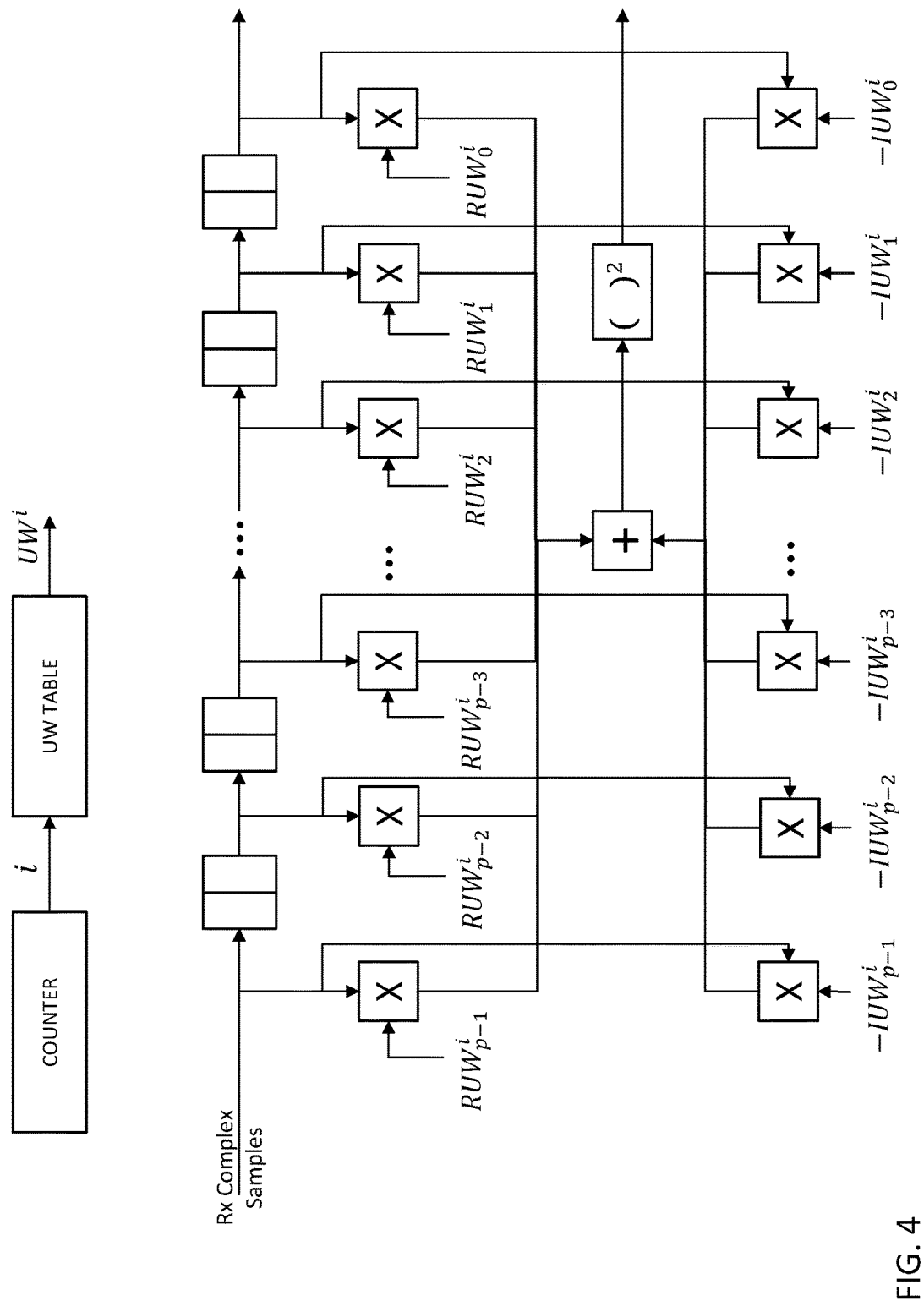
FIG. 4 illustrates a block diagram of a parallel unique word (UW) correlator of a complex receiver sampling scheme for QPSK modulation, in accordance with example embodiments of the present invention.

FIG. 4 illustrates a block diagram of a parallel unique word correlator of a complex receiver sampling scheme for QPSK modulation, in accordance with example embodiments of the present invention. Two samples are used to represent a modulation symbol. At a sampling clock cycle, the correlator will shift in one received sample, and correlate (one at a time) with all n possible UWs of width p bits each. With reference to FIG. 4, $UW^i$ reflects the $i^{th}$ UW in the receiver table (the UW in the table indexed by the index i), which can be expressed in its real and imaginary components as $RUW^i$ and $IUW^i$, respectively ($UW^i=[RUW^i, IUW^i]$). Further, the real and imaginary components can be represented in binary format, as follows:

$$RUW^i=\{RUW_0^i,RUW_1^i,RUW_2^i,\ldots,RUW_{p-2}^i,RUW_{p-1}^i\}$$

$$IUW^i=\{IUW_0^i,IUW_1^i,IUW_2^i,\ldots,IUW_{p-2}^i,IUW_{p-1}^i\}$$

In this binary format, a 0 means a "+1" and a multiply by 0 means "passing through." Similarly, a 1 means a "−1", and multiply by 1 means "2's complement". All n UWs of the table programmed or stored in the receiver should be cycled through within the one sample duration. Alternatively, in the case where the universe of UWs is segregated into subsets or pools (e.g., applied on a beam-by-beam basis, as described above), then a given receiver need only cycle through all UWs of its respective pool. Similarly, the cycling through a respective pool should also be completed within the one sample duration. The result of the correlation or the interpolated correlation peak output is compared against an adjustable detection threshold. The value of the threshold is determined by a classical tradeoff between probability of miss-detect and false-alarm. Once a UW passes the threshold, its index is marked and the UW and associated initial scrambling vector or seed is used by the receiver for the further decoding and descrambling of the respective data signal.

Further, the correlation results may be used to estimate the initial phase of the particular burst, and the correlator output may be used to estimate the power level of the burst. Additionally, the peak of the correlator value, along with the value adjacent to the peak, may be used to estimate the timing of the start of the burst. All these burst parameter values may also be used by the receiver for the further decoding and descrambling of the respective data signal. The same general approach is applicable for Offset-QPSK (OQPSK) modulated signals. Because OQPSK offsets the Imaginary part of the signal by half a symbol before it is transmitted, the lower half the correlator of FIG. 4 would thus take the complex sample inputs by the same half symbol offset. In other words, it will take inputs from one element later, instead of the same as the top half of the correlator. The various algorithms that may be employed to estimate these burst parameter values are beyond the scope of the embodiments of the present invention, as they would be readily known to one of skill in the art—and thus are not discussed herein.

The term "computer-readable medium" as used herein refers to any medium that participates in providing instructions to the processor 403 for execution. Such a medium may take many forms, including but not limited to non-volatile media, and volatile media. Non-volatile media include, for example, optical or magnetic disks, such as storage device 409. Volatile media may include dynamic memory, such as main memory 405. Common forms of computer-readable media include, for example, a floppy disk, a flexible disk, hard disk, magnetic tape, any other magnetic medium, a CD ROM, CDRW, DVD, any other optical medium, RAM, PROM, and EPROM, FLASH EPROM, any other memory chip or cartridge, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A communications terminal comprising:
    an encoder configured to encode a source digital data signal to generate an encoded signal, wherein the source digital data signal comprises a source bit stream;
    a scrambler configured to scramble the encoded signal based on a scrambling signature associated with the communications terminal, and to format the scrambled signal into a sequence of data frames, wherein each data frame comprises a data payload that includes a block of the scrambled encoded signal, and a frame header that includes a start of frame (SOF) sequence associated with the scrambling signature;
    a modulator configured to modulate the sequence of data frames to generate a transmission signal; and
    a transmitter configured to transmit the transmission signal via respective time slots of a random access channel of a wireless communications system; and wherein the SOF sequence for each frame of the sequence of data frames comprises a one unique word segment that is associated with the communications terminal and is configured as a reference for synchronization by a receiving communications terminal on frame boundaries,
    wherein the one unique word segment is associated with the scrambling signature and thereby identifies the scrambling signature to the receiving communications terminal for descrambling the data payload of the data frame, and
    wherein the one unique word segment is configured for identification by the receiving communications terminal via a correlation process and thereby facilitates the receiving communications terminal to be able to distinguish the data frame from one or more at least partially overlapping data frames respectively originating from one or more further communications terminals respectively employing one or more unique word segments that are different from the one unique word segment, transmitted via a common time slot of the random access channel.

2. The communications terminal according to claim 1, wherein the one unique word segment is configured such that one or more of its auto-correlation and cross-correlation properties drop rapidly with increasing time offsets.

3. The communications terminal according to claim 1, wherein the transmitter is configured to transmit the transmission signal via a subset of the time slots of the random access channel that are allocated to the communications terminal.

4. The communications terminal according to claim 1, wherein the transmitter is configured to transmit the transmission signal via each respective time slot of the random access channel based on a randomized start time with respect to a reference time.

5. The communications terminal according to claim 1, wherein, at a time of each transmission by the communications terminal, the communications terminal is configured to select the scrambling signature from a predetermined set of available scrambling signatures based on a randomized selection process.

6. The communications terminal according to claim 1, wherein the communications terminal is one of a group of communications terminals, wherein the scrambling signature is associated with each communications terminal of the group.

7. A method comprising:
    encoding, by a communications terminal, a source digital data signal to generate an encoded signal, wherein the source digital data signal comprises a source bit stream;
    scrambling the encoded signal based on a scrambling signature associated with the communications terminal, and formatting the scrambled signal into a sequence of data frames, wherein each data frame comprises a data payload that includes a block of the scrambled encoded signal, and a frame header that includes a start of frame (SOF) sequence associated with the scrambling signature;
    modulating the sequence of data frames to generate a transmission signal; and
    transmitting the transmission signal by the communications terminal via respective time slots of a random access channel of a wireless communications system; and wherein the SOF sequence for each frame of the sequence of data frames comprises a one unique word segment that is associated with the communications terminal and is configured as a reference for synchronization by a receiving communications terminal on frame boundaries, wherein the one unique word segment is associated with the scrambling signature and thereby identifies the scrambling signature to the receiving communications terminal for descrambling the data payload of the data frame, and wherein the one unique word segment is configured for identification by the receiving communications terminal via a correlation process and thereby facilitates the receiving communications terminal to be able to distinguish the data frame from one or more at least partially overlapping data frames respectively originating from one or more further communications terminals respectively employing one or more unique word segments that are different from the one unique word segment, transmitted via a common time slot of the random access channel.

8. The method according to claim 7, wherein the one unique word segment is configured such that one or more of its auto-correlation and cross-correlation properties drop rapidly with increasing time offsets.

9. The method according to claim 7, wherein the transmission signal is transmitted via a subset of the time slots of the random access channel that are allocated to the communications terminal.

10. The method according to claim 7, wherein the transmission signal is transmitted via each respective time slot of the random access channel based on a randomized start time with respect to a reference time.

11. The method according to claim 7, wherein, at a time of each transmission by the communications terminal, the method further comprises:
selecting the scrambling signature from a predetermined set of available scrambling signatures based on a randomized selection process.

12. The method according to claim 7, wherein the communications terminal is one of a group of communications terminals, wherein the scrambling signature is associated with each communications terminal of the group.

13. A system comprising:
a first communications terminal comprising
a first encoder configured to encode a first source digital data signal to generate a first encoded signal, wherein the first source digital data signal comprises a first source bit stream,
a first scrambler configured to scramble the first encoded signal based on a first scrambling signature associated with the first communications terminal, and to format the scrambled first encoded signal into a first sequence of data frames, wherein each data frame of the first sequence of data frames comprises a data payload that includes a block of the scrambled first encoded signal, and a frame header that includes a first start of frame (SOF) sequence associated with the first scrambling signature,
a first modulator configured to modulate the first sequence of data frames to generate a first transmission signal, and
a first transmitter configured to transmit the first transmission signal via respective time slots of a random access channel of a wireless communications system; and a second communications terminal comprising
a second encoder configured to encode a second source digital data signal to generate a second encoded signal, wherein the second source digital data signal comprises a second source bit stream,
a second scrambler configured to scramble the second encoded signal based on a second scrambling signature associated with the second communications terminal, and to format the scrambled second encoded signal into a second sequence of data frames, wherein each data frame of the second sequence of data frames comprises a data payload that includes a block of the scrambled second encoded signal, and a frame header that includes a second start of frame (SOF) sequence associated with the second scrambling signature,
a second modulator configured to modulate the second sequence of data frames to generate a second transmission signal, and
a second transmitter configured to transmit the second transmission signal via respective time slots of the random access channel of the wireless communications system; and wherein the first SOF sequence for each frame of the first sequence of data frames comprises a first unique word segment that is associated with the first communications terminal and is configured as a reference for synchronization by a receiving communications terminal on frame boundaries, wherein the first unique word segment is associated with the first scrambling signature and thereby identifies the first scrambling signature to the receiving communications terminal for descrambling the data payload of the data frame, and wherein the first unique word segment is configured for identification by the receiving communications terminal via a correlation process and thereby facilitates the receiving communications terminal to be able to distinguish the data frame from an at least partially overlapping data frame of the second sequence of data frames originating from the second communications terminal that employs a second unique word segment that is different from the first unique word segment, transmitted via a common time slot of the random access channel.

14. The system according to claim 13, wherein the first unique word segment is configured such that one or more of its auto-correlation and cross-correlation properties drop rapidly with increasing time offsets, and the second unique word segment is configured such that one or more of its auto-correlation and cross-correlation properties drop rapidly with increasing time offsets.

15. The system according to claim 13, wherein the first transmitter is configured to transmit the first transmission signal via a first subset of the time slots of the random access channel that are allocated to the first communications terminal, and the second transmitter is configured to transmit the second transmission signal via a second subset of the time slots of the random access channel that are allocated to the second communications terminal.

16. The system according to claim 13, wherein the first transmitter is configured to transmit the first transmission signal via each respective time slot of the random access channel based on a first randomized start time with respect to a reference time, and the second transmitter is configured to transmit the second transmission signal via each respective time slot of the random access channel based on a second randomized start time with respect to the reference time.

17. The system according to claim 13, wherein, at a time of each transmission by the first communications terminal, the first communications terminal is configured to select the first scrambling signature from a predetermined set of available scrambling signatures based on a randomized selection process, and at a time of each transmission by the second communications terminal, the second communications terminal is configured to select the second scrambling signature from the predetermined set of available scrambling signatures based on the randomized selection process.

\* \* \* \* \*